US012656476B2

(12) United States Patent
Zheng et al.

(10) Patent No.: US 12,656,476 B2
(45) Date of Patent: Jun. 16, 2026

(54) POSITIONING METHOD, SYSTEM AND DEVICE, STORAGE MEDIUM, AND PROGRAM PRODUCT

(71) Applicant: ZTE Corporation, Shenzhen (CN)

(72) Inventors: Zheng Zheng, Shenzhen (CN); Huanhuan Mao, Shenzhen (CN); Ping Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 232 days.

(21) Appl. No.: 18/688,954

(22) PCT Filed: Apr. 27, 2023

(86) PCT No.: PCT/CN2023/091288
§ 371 (c)(1),
(2) Date: Mar. 4, 2024

(87) PCT Pub. No.: WO2023/236682
PCT Pub. Date: Dec. 14, 2023

(65) Prior Publication Data
US 2024/0337745 A1 Oct. 10, 2024

(30) Foreign Application Priority Data
Jun. 10, 2022 (CN) .......................... 202210651458.8

(51) Int. Cl.
*G01S 13/75* (2006.01)
*G01S 13/76* (2006.01)

(52) U.S. Cl.
CPC .............. *G01S 13/75* (2013.01); *G01S 13/76* (2013.01)

(58) Field of Classification Search
CPC ........ G01S 13/75; G01S 13/76; G01S 13/765; G01S 2205/02; G01S 5/0236;
(Continued)

(56) References Cited

U.S. PATENT DOCUMENTS 10,484,078 B2 * 11/2019 Gharavi .............. H04B 7/0617
11,026,067 B2 * 6/2021 Martin ................. G01S 1/0428
(Continued)

FOREIGN PATENT DOCUMENTS

CN 104360307 A 2/2015
CN 110971326 A 4/2020
(Continued)

OTHER PUBLICATIONS

International Search Report and Written Opinion for International Application No. PCT/CN2023/091288, mailed Aug. 10, 2023.

*Primary Examiner* — Peter M Bythrow
(74) *Attorney, Agent, or Firm* — Wolf, Greenfield & Sacks, P.C.

(57) ABSTRACT

A positioning method, system and device, a storage medium, and a program product are disclosed. The positioning method may include: acquiring parameter information of at least two Reconfigurable Intelligent Surfaces (RISs) and parameter information of a base station; acquiring first time information and second time information, the first time information is information representing a time difference between a time point at which the base station sends a first positioning signal and a time point at which the base station receives a second positioning signal, and the second time information is information representing a time difference between a time point at which a terminal device sends the second positioning signal and a time point at which the terminal device receives the first positioning signal; and obtaining location information of the terminal device.

20 Claims, 9 Drawing Sheets

(58) Field of Classification Search
CPC ... G01S 5/0273; G01S 7/006; H04B 7/04013;
H04W 4/021; H04W 4/33; H04W 64/00
See application file for complete search history.

(56) References Cited

U.S. PATENT DOCUMENTS

| | | | | |
|---|---|---|---|---|
| 11,330,550 | B2 * | 5/2022 | Akkarakaran | H04W 84/047 |
| 11,770,175 | B2 * | 9/2023 | Dai | H04W 8/005 |
| | | | | 370/315 |
| 11,921,192 | B2 * | 3/2024 | Shoarinejad | G01S 19/13 |
| 12,196,845 | B2 * | 1/2025 | Bayesteh | G01S 13/42 |
| 12,292,522 | B2 * | 5/2025 | Wang | G01S 5/0273 |
| 12,339,384 | B2 * | 6/2025 | Penna | H04W 64/00 |
| 2011/0201357 | A1 * | 8/2011 | Garrett | G01S 5/12 |
| | | | | 455/456.2 |
| 2017/0082729 | A1 * | 3/2017 | Bar-Shalom | G01S 5/12 |
| 2019/0020401 | A1 * | 1/2019 | Gharavi | H04B 7/0617 |
| 2020/0067593 | A1 * | 2/2020 | Gharavi | H04B 17/318 |
| 2020/0296680 | A1 * | 9/2020 | Akkarakaran | G01S 5/0273 |
| 2021/0219254 | A1 | 7/2021 | Wang et al. | |
| 2021/0302561 | A1 * | 9/2021 | Bayesteh | G01S 13/42 |
| 2022/0107384 | A1 * | 4/2022 | Duan | G01S 13/003 |
| 2022/0247480 | A1 * | 8/2022 | Papadopoulos | G01S 5/0273 |
| 2023/0106576 | A1 * | 4/2023 | De Vegt | G07C 9/00309 |
| | | | | 455/456.2 |
| 2024/0007147 | A1 * | 1/2024 | Sahraei | H04B 7/2612 |
| 2024/0356625 | A1 * | 10/2024 | Walker | H04B 7/15528 |

FOREIGN PATENT DOCUMENTS

| | | |
|---|---|---|
| CN | 111245494 A | 6/2020 |
| CN | 111983560 A | 11/2020 |
| CN | 112312306 A | 2/2021 |
| CN | 112986903 A | 6/2021 |
| CN | 115914989 A | 4/2023 |
| WO | 2021/221603 A1 | 11/2021 |
| WO | 2022/051882 A1 | 3/2022 |

* cited by examiner

200
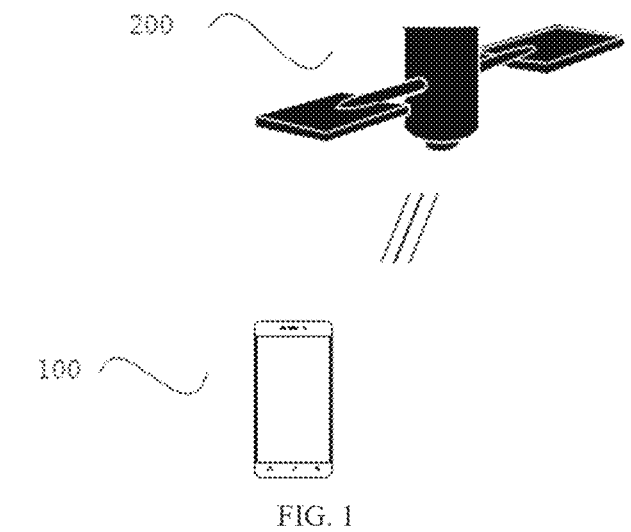
100
FIG. 1
200
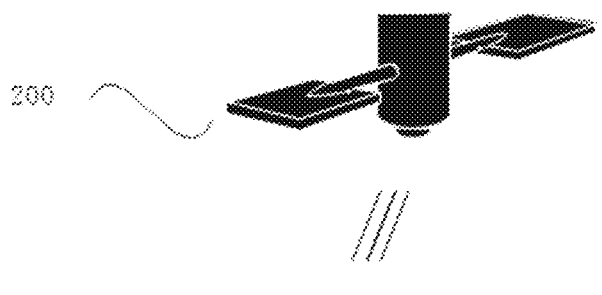
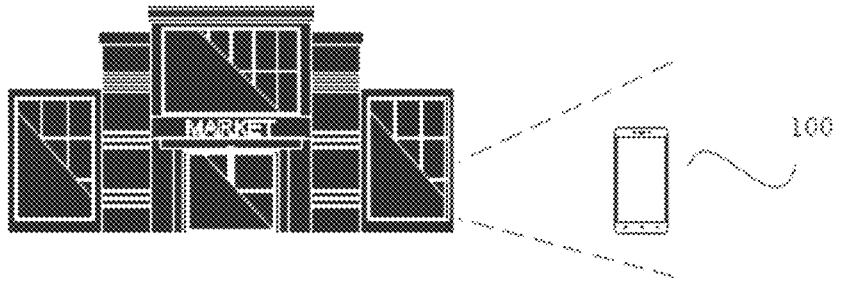
100
FIG. 2

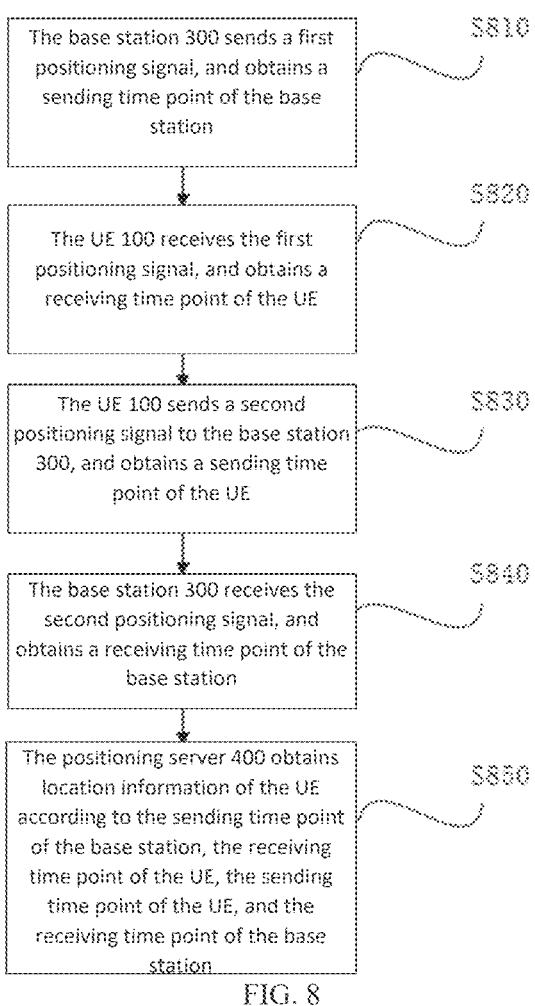

The base station 300 sends a first positioning signal, and obtains a sending time point of the base station — S810

The UE 100 receives the first positioning signal, and obtains a receiving time point of the UE — S820

The UE 100 sends a second positioning signal to the base station 300, and obtains a sending time point of the UE — S830

The base station 300 receives the second positioning signal, and obtains a receiving time point of the base station — S840

The positioning server 400 obtains location information of the UE according to the sending time point of the base station, the receiving time point of the UE, the sending time point of the UE, and the receiving time point of the base station — S850

FIG. 8

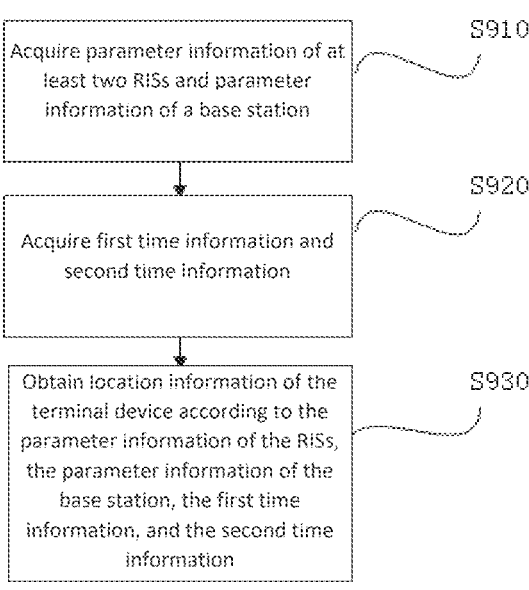

Acquire parameter information of at least two RISs and parameter information of a base station — S910

Acquire first time information and second time information — S920

Obtain location information of the terminal device according to the parameter information of the RISs, the parameter information of the base station, the first time information, and the second time information — S930

FIG. 9

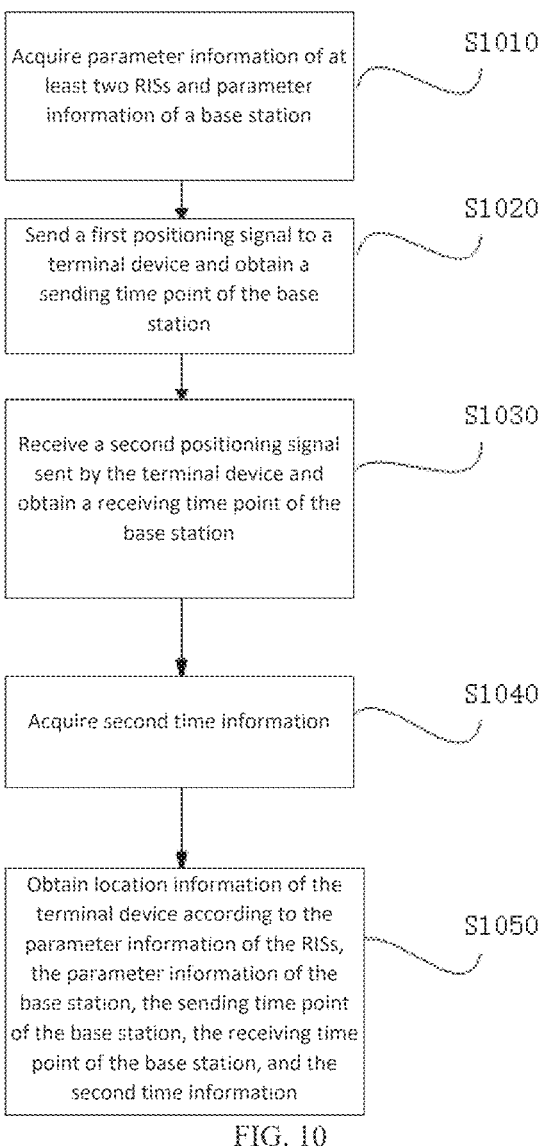

Acquire parameter information of at least two RISs and parameter information of a base station — S1010

Send a first positioning signal to a terminal device and obtain a sending time point of the base station — S1020

Receive a second positioning signal sent by the terminal device and obtain a receiving time point of the base station — S1030

Acquire second time information — S1040

Obtain location information of the terminal device according to the parameter information of the RISs, the parameter information of the base station, the sending time point of the base station, the receiving time point of the base station, and the second time information — S1050

FIG. 10

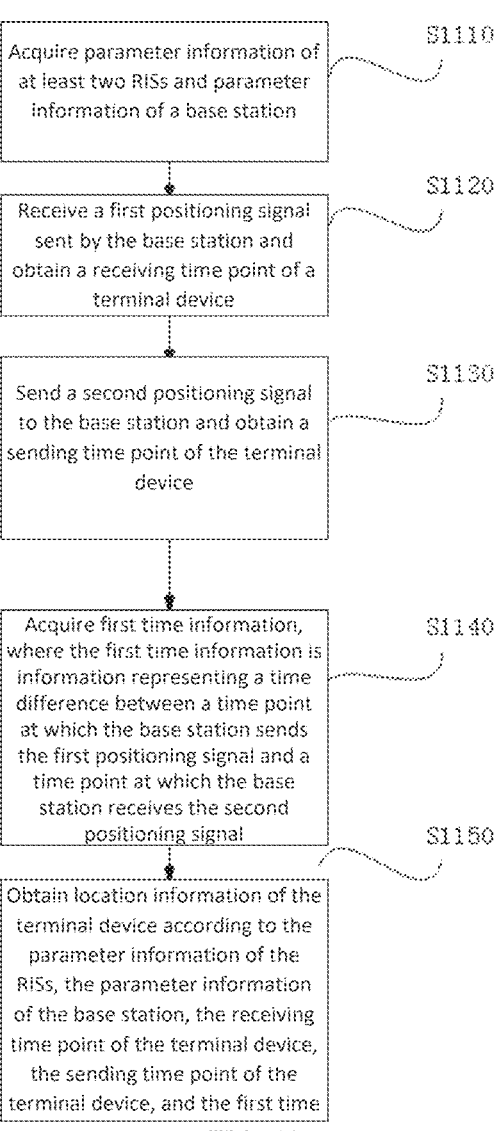

Acquire parameter information of at least two RISs and parameter information of a base station — S1110

Receive a first positioning signal sent by the base station and obtain a receiving time point of a terminal device — S1120

Send a second positioning signal to the base station and obtain a sending time point of the terminal device — S1130

Acquire first time information, where the first time information is information representing a time difference between a time point at which the base station sends the first positioning signal and a time point at which the base station receives the second positioning signal — S1140

Obtain location information of the terminal device according to the parameter information of the RISs, the parameter information of the base station, the receiving time point of the terminal device, the sending time point of the terminal device, and the first time — S1150

FIG. 11

POSITIONING METHOD, SYSTEM AND DEVICE, STORAGE MEDIUM, AND PROGRAM PRODUCT

CROSS-REFERENCE TO RELATED APPLICATION

This application is a national stage filing under 35 U.S.C. § 371 of International Patent Application Serial No. PCT/CN2023/091288, filed Apr. 27, 2023, which claims priority to Chinese patent application No. 202210651458.8 filed Jun. 10, 2022. The contents of these applications are incorporated herein by reference in their entireties.

TECHNICAL FIELD

Embodiments of the present disclosure relate to the technical field of communications, and more particularly, to a positioning method, system and device, a storage medium, and a program product.

BACKGROUND

With the advancement of communication technologies, there is an increasing demand for precise location tracking in user equipment, such as terminal devices. Positioning based on a Global Navigation Satellite System (GNSS) provides high precision for outdoor positioning, but low precision for indoor positioning. Base station-based positioning can improve the precision of indoor positioning, yet its practicality is limited due to the need for collaboration among multiple base stations with precise time synchronization.

Currently, finding a method for effective and precise positioning is an urgent issue that needs to be addressed.

SUMMARY

Embodiments of the present disclosure provide a positioning method, system and device, a computer-readable storage medium, and a computer program product, to improve the feasibility of positioning and the positioning precision.

In accordance with a first aspect of the present disclosure, an embodiment provides a positioning method, including: acquiring parameter information of at least two Reconfigurable Intelligent Surfaces (RISs) and parameter information of a base station; acquiring first time information and second time information, where the first time information is information representing a time difference between a time point at which the base station sends a first positioning signal and a time point at which the base station receives a second positioning signal, and the second time information is information representing a time difference between a time point at which a terminal device sends the second positioning signal and a time point at which the terminal device receives the first positioning signal; and obtaining location information of the terminal device according to the parameter information of the RISs, the parameter information of the base station, the first time information, and the second time information.

In accordance with a second aspect of the present disclosure, an embodiment provides a positioning method, including: acquiring parameter information of at least two RISs and parameter information of a base station; sending a first positioning signal to a terminal device and obtaining a sending time point of the base station; receiving a second positioning signal sent by the terminal device and obtaining a receiving time point of the base station; acquiring second time information, where the second time information is information representing a time difference between a time point at which the terminal device sends the second positioning signal and a time point at which the terminal device receives the first positioning signal; and obtaining location information of the terminal device according to the parameter information of the RISs, the parameter information of the base station, the sending time point of the base station, the receiving time point of the base station, and the second time information.

In accordance with a third aspect of the present disclosure, an embodiment provides a positioning method, including: acquiring parameter information of at least two RISs and parameter information of a base station; receiving a first positioning signal sent by the base station and obtaining a receiving time point of a terminal device; sending a second positioning signal to the base station and obtaining a sending time point of the terminal device; acquiring first time information, where the first time information is information representing a time difference between a time point at which the base station sends the first positioning signal and a time point at which the base station receives the second positioning signal, and obtaining location information of the terminal device according to the parameter information of the RISs, the parameter information of the base station, the receiving time point of the terminal device, the sending time point of the terminal device, and the first time information.

In accordance with a fourth aspect of the present disclosure, an embodiment provides a positioning method, including: sending, by a base station, a first positioning signal and obtaining a sending time point of the base station; receiving, by a terminal device, the first positioning signal and obtaining a receiving time point of the terminal device; sending, by the terminal device, a second positioning signal to the base station and obtaining a sending time point of the terminal device; receiving, by the base station, the second positioning signal and obtaining a receiving time point of the base station; and obtaining location information of the terminal device according to the sending time point of the base station, the receiving time point of the terminal device, the sending time point of the terminal device, and the receiving time point of the base station.

In accordance with a fifth aspect of the present disclosure, an embodiment provides a positioning system, including: a base station, configured for acquiring first time information, where the first time information is information representing a time difference between a time point at which the base station sends a signal and a time point at which the base station receives another signal; a terminal device, configured for acquiring second time information, where the second time information is information representing a time difference between a time point at which the terminal device sends the another signal and a time point at which the terminal device receives the signal; an RIS, configured for providing a signal transmission path between the base station and the terminal device, where the signal transmission path is a reflection path; and a positioning server, configured for positioning the terminal device according to the first time information and the second time information.

In accordance with a sixth aspect of the present disclosure, an embodiment provides a positioning device, including: a memory, a processor, and a computer program stored in the memory and executable by the processor which, when executed by the processor, causes the processor to implement the positioning method in accordance with the first, second, third, or fourth aspect.

In accordance with a seventh aspect of the present disclosure, an embodiment provides a computer-readable storage medium, storing a computer-executable instruction which, when executed by a processor, causes the processor to implement the positioning method in accordance with the first, second, third, or fourth aspect.

In accordance with an eighth aspect of the present disclosure, an embodiment provides a computer program product, including a computer program or a computer instruction stored in a computer-readable storage medium which, when read and executed by a processor of a computer device, causes the processor to implement the positioning method in accordance with the first, second, third, or fourth aspect.

BRIEF DESCRIPTION OF DRAWINGS

FIG. 1 is a schematic diagram of positioning a User Equipment (UE) by a Global Positioning System (GPS);

FIG. 2 is a schematic diagram of a UE in an indoor scenario such as a shopping mall or an underground parking lot;

FIG. 8 is a flowchart of a positioning method according to an embodiment of the present disclosure;

FIG. 9 is a flowchart of a positioning method according to an embodiment of the present disclosure;

FIG. 10 is a flowchart of a positioning method according to an embodiment of the present disclosure;

FIG. 11 is a flowchart of a positioning method according to an embodiment of the present disclosure.

DETAILED DESCRIPTION

Figure 3:
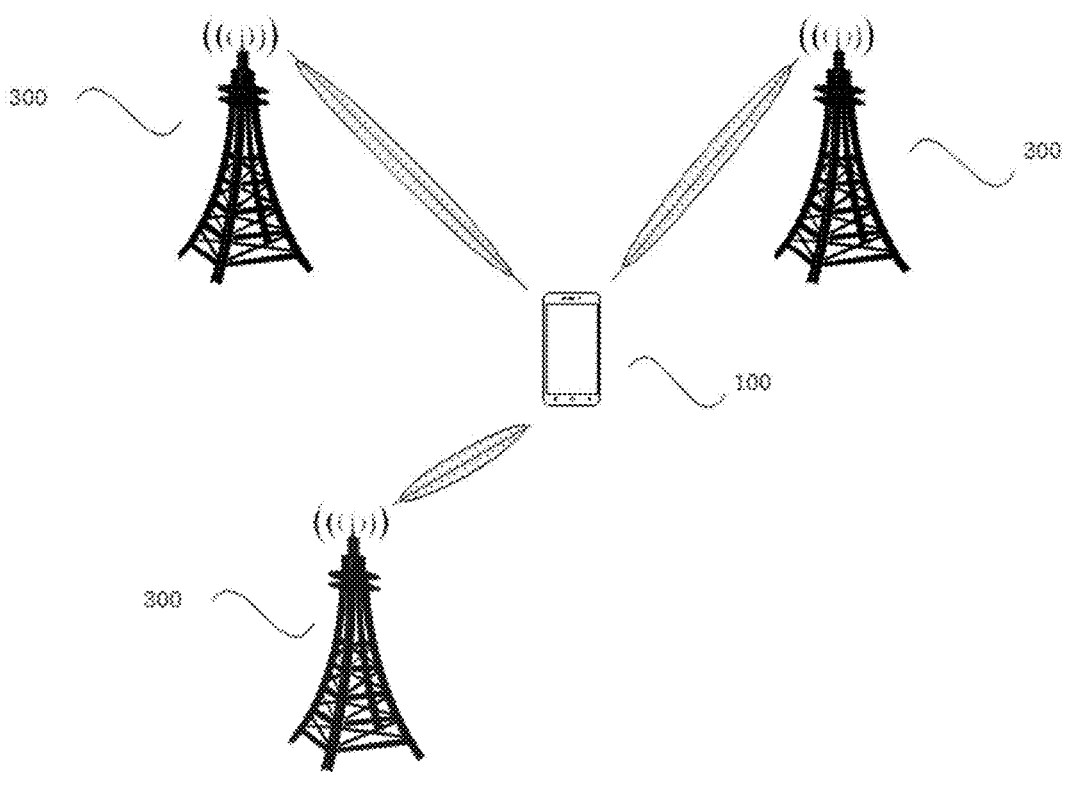
FIG. 3 is a schematic diagram of collaboratively positioning a UE by a plurality of base stations.

To make the objects, technical schemes, and advantages of the present disclosure clear, the present disclosure is described in further detail in conjunction with accompanying drawings and examples. It should be understood that the specific embodiments described herein are merely used for illustrating the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms "first," "second," and similar designations in the description, claims, and accompanying drawings serve to differentiate similar elements and do not necessarily imply a specific order or precedence.

In the description of the embodiments of the present disclosure, unless otherwise explicitly defined, the terms such as "configure", "install/mount" and "connect" should be understood in a broad sense, and those having ordinary skills in the art can reasonably determine the specific meanings of the above terms in the embodiments of the present disclosure based on the specific contents of the technical schemes. In the embodiments of the present disclosure, any embodiment or design described following the terms such as "in an embodiment," "in some embodiments," and "for example" is used to indicate examples, explanations, or illustrations, and should not be construed as being superior or advantageous over other embodiments or designs. The use of the terms such as "in an embodiment," "in some embodiments," and "for example" is intended to present the relevant concepts in a concrete manner.

The embodiments of the present disclosure may be applied to various communication systems, such as a Global System for Mobile communications (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a Universal Mobile Telecommunications System (UMTS) system, a 5th Generation (5G) system, a Beyond Fifth Generation (B5G) system, a 6th Generation (6G) system, etc., which is not limited in the embodiments of the present disclosure.

A target terminal device in the embodiments of the present disclosure may be a device capable of communicating with a base station. The target terminal device may be any device having a wireless transceiver function, including, but not limited to: a mobile phone, a tablet computer, a mobile computer, an electronic bracelet, an electronic watch, a smart wearable device, an intelligent vehicle, etc., which is not limited in the embodiments of the present disclosure.

A base station in the embodiments of the present disclosure may be a device capable of communicating with the target terminal device. The base station may be any device having a wireless transceiver function, including, but not limited to: a NodeB, an evolved NodeB (eNodeB), a next generation NodeB (gNB) in a 5G communication system, a base station in a future communication system, an access node in a Wireless Fidelity (Wi-Fi) system, a wireless relay node, wireless backhaul node, etc. The base station may also be a radio controller in a Cloud Radio Access Network (CRAN) scenario. The base station may also be a small cell, a Transmission/Reception Point (TRP), etc., which is not limited in the embodiments of the present disclosure.

At present, positioning of the target terminal device mainly depends on a satellite navigation system. The satellite navigation system can accurately position an outside/outdoor target terminal device, but when the target terminal device is located in an indoor environment, location information of the target terminal device cannot be obtained by using the satellite navigation system, i.e., positioning of the target terminal device cannot be implemented.

To set forth the present technical scheme, a GPS positioning system and a UE are used as examples to further illustrate positioning methods in related technologies.

FIG. 1 is a schematic diagram of positioning a UE by a GPS. As shown in FIG. 1, a UE 100 is in an outdoor environment and can receive a signal from a GPS 200. Positioning of the UE 100 is implemented based on a distance intersection method using a positioning signal.

FIG. 2 is a schematic diagram of a UE in an indoor scenario such as a shopping mall or an underground parking lot. As shown in FIG. 2, a UE 100 is in an indoor environment and can hardly receive a positioning signal from a GPS 200 and therefore can hardly acquire location information of the UE 100.

FIG. 3 is a schematic diagram of collaboratively positioning a UE by a plurality of base stations. As shown in FIG. 3, to solve the problem that a satellite navigation system can hardly position an indoor UE, a plurality of base stations are used in related technologies to collaboratively position the UE. Although this positioning method can position a UE located indoors, it requires the use of a plurality of base stations, e.g., three base stations 300 need to collaboratively operate as shown in FIG. 3, and it also requires precise time synchronization between the plurality of base stations. A Line of Sight (LOS) environment is further required between the three base stations 300 and the UE 100 to achieve precise positioning of the indoor UE. As can be seen, the positioning of the UE by the plurality of base stations needs to satisfy strict conditions, which can hardly be met in an actual cellular network.

The embodiments of the present disclosure provide a positioning, system and device, a computer-readable storage medium, and a computer program product. Time information of signal sending and receiving between a base station, an RIS, and a target terminal device is analyzed, to obtain positioning information of the target terminal device. This not only can realize the positioning of the target terminal device located in an indoor environment, but also can reduce the conditions for obtaining the positioning information and improve the positioning accuracy.

The embodiments of the present disclosure will be further described in detail below with reference to the accompanying drawings.

Figure 4:
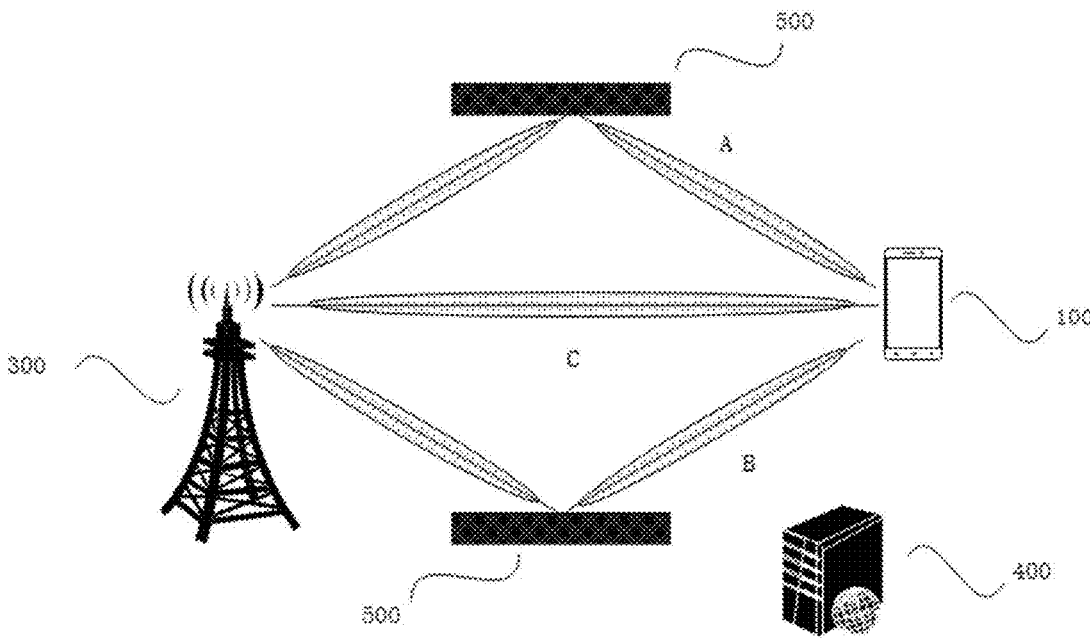
FIG. 4 is a schematic architectural diagram of a positioning system according to an embodiment of the present disclosure.
Figure 6:
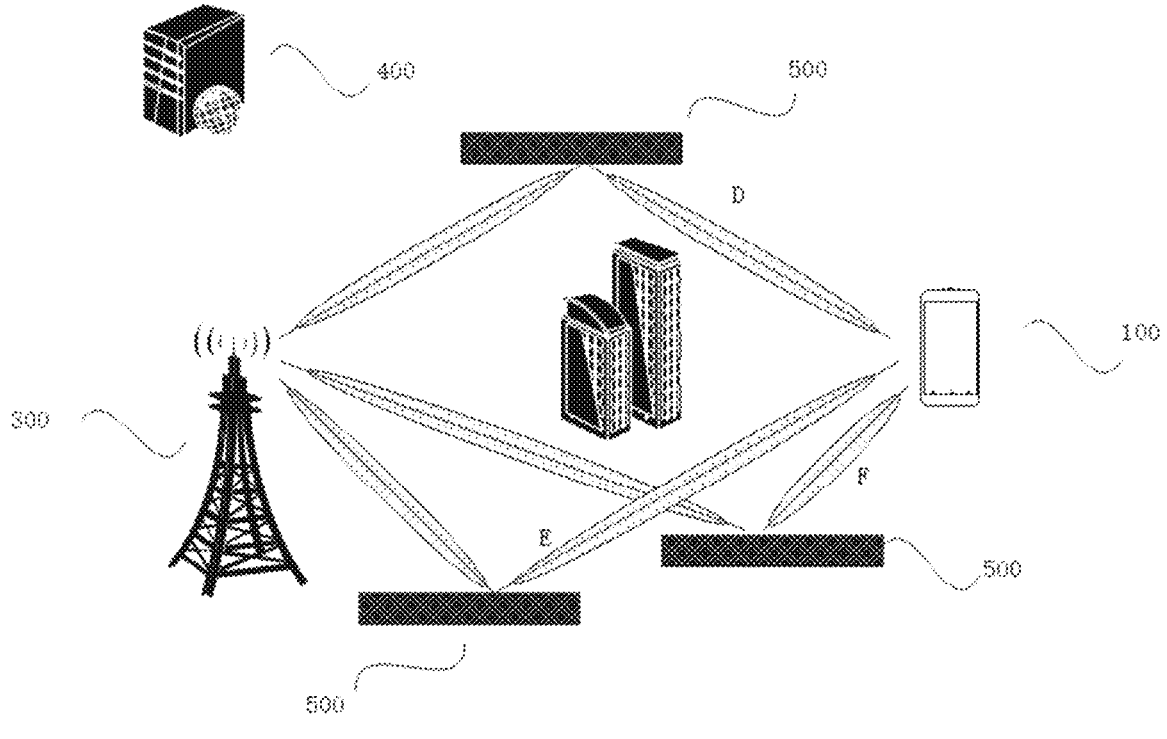
FIG. 6 is a schematic architectural diagram of a positioning system according to an embodiment of the present disclosure.

FIG. 4 and FIG. 6 are schematic diagrams of two system architectures configured for executing a method for positioning a target terminal device according to an embodiment of the present disclosure. As shown in FIG. 4 and FIG. 6, the positioning system architecture includes a target terminal device such as a UE 100, a base station 300, at least two RISs 500, and a Location Management Function (LMF) apparatus.

The UE 100, i.e., the target terminal device to be positioned, can communicate with the base station 300 and the RISs 500.

The base station 300 is configured to communicate with the UE 100 and the RISs 500 in a wired or wireless manner.

In a feasible implementation, the base station 300 is configured to acquire parameter information of the RISs 500 and parameter information of the base station 300.

In a feasible implementation, the parameter information of the RISs may include array configuration information of the RISs, and may further include geographic information of the RISs. The array configuration information may include at least one of: a number of horizontal array elements, a number of vertical array elements, a spacing between array elements, a number of quantized bits, etc. The geographic information may include GPS coordinates, longitude and latitude coordinates, altitude, orientation, downtilt angle, location information in a geocentric rectangular coordinate system, location information in a geodetic coordinate system, etc.

In a feasible implementation, the parameter information of the base station may include geographic information of the base station. The geographic information may include GPS coordinates, longitude and latitude coordinates, altitude, orientation, downtilt angle, location information in a geocentric rectangular coordinate system, location information in a geodetic coordinate system, etc.

In another feasible implementation, the base station 300 obtains a first target beam matching the RISs, i.e., an optimal paired beam or a codebook of the optimal beam, according to the parameter information of the RISs 500 and the parameter information of the base station.

In a feasible implementation, the base station 300 sends the parameter information of the RISs 500 and the parameter information of the base station to the LMF apparatus.

In another feasible implementation, the base station 300 acquires positioning signal configuration information allocated by the LMF apparatus. The positioning signal configuration information is configured according to the parameter information of the RISs 500 and the parameter information of the base station.

In a feasible implementation, the base station 300 acquires parameter information of the UE 100.

In another feasible implementation, the base station 300 obtains a second target beam matching the UE 100, i.e., an optimal paired beam or a codebook of the optimal beam, according to the parameter information of the RISs 500, the parameter information of the base station, and the parameter information of the UE 100.

The RIS 500, also known as an Intelligent Reflective Surface (IRS), includes an array of intelligent reflective units, each of which is configured to independently make certain changes to an incident signal. The RIS 500 integrates a plurality of passive reflection units. By adjusting the phases of the reflection units, the wireless network environment can be intelligently adjusted to improve the coverage performance of the wireless communication network. The RISs 500 have the characteristics of low power consumption, easy deployment, etc. There may be two or more RISs 500.

The LMF apparatus, or referred to as a positioning management function apparatus, may be arranged in a positioning server 400 or may be integrated in the UE 100 or the base station 300.

The positioning server 400 may obtain location information of the UE 100 by acquiring the parameter information of the base station 300, the parameter information of the RISs 500, first time information provided by the base station 300, and second time information provided by the UE 100.

As shown in FIG. 4, a line-of-sight path exists between the base station 300 and the UE 100, and at least two RISs are required to position the UE.

The base station 300 is configured for acquiring first time information, where the first time information is information representing a time difference between a time point at which the base station 300 sends a signal and a time point at which the base station 300 receives another signal. The base station 300 at least receives a signal respectively transmitted through three transmission paths, namely, a first reflection path A, a second reflection path B, and a line-of-sight transmission path C.

The UE 100 is configured for acquiring second time information, where the second time information is information representing a time difference between a time point at which the UE 100 sends the another signal and a time point at which the UE 100 receives the signal. The UE 100 at least receives a signal respectively transmitted through three transmission paths, namely, a first reflection path A, a second reflection path B, and a line-of-sight transmission path C.

The RIS 500 is configured for providing a signal transmission path between the base station 300 and the UE 100.

In a feasible implementation, the signal transmission path is a reflection path passing through the RIS 500.

The positioning server 400 is configured for positioning the UE 100 according to the first time information and the second time information.

Figure 5:
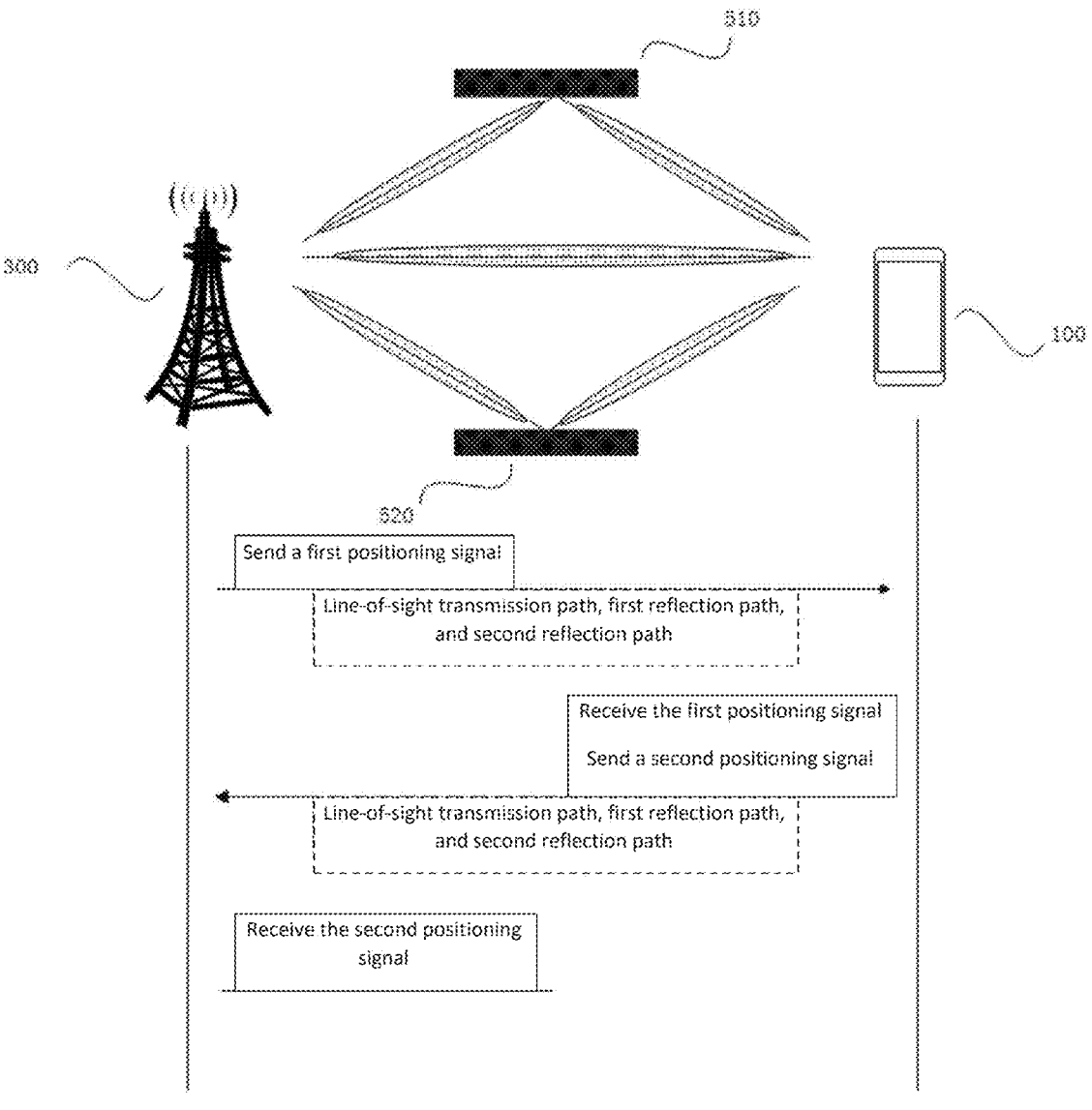
FIG. 5 is a flowchart of a positioning method according to an embodiment of the present disclosure.

FIG. 5 is a schematic diagram of a positioning method according to an embodiment of the present disclosure. The positioning method in this embodiment may be applied to the system architecture shown in FIG. 4.

The base station 300 sends a first positioning signal to the UE 100.

In a feasible implementation, the first positioning signal sent by the base station 300 is transmitted to the UE 100 via the line-of-sight transmission path C.

For example, the line-of-sight transmission path C includes a transmission path directly passing through the base station 300 and the UE 100. The positioning signal may be sent out from the base station 300 along the line-of-sight transmission path C and directly transmitted to the UE 100. It can be understood that the positioning signal may also be sent out from the UE 100 along the line-of-sight transmission path C and directly transmitted to the base station 300.

In a feasible implementation, the first positioning signal is a positioning reference signal (PRS).

In a feasible implementation, the first positioning signal sent by the base station 300 is transmitted to the UE 100 via the first reflection path A.

The first reflection path A is provided through a first RIS 510. For example, the first reflection path A includes a transmission path passing through the base station 300, the first RIS 510, and the UE 100. The positioning signal may be sent out from the base station 300 along the first reflection path A, and reach the UE 100 after passing through the first RIS 510. It can be understood that the positioning signal may also be sent out from the UE 100 along the first reflection path A, and reach the base station 300 after passing through the first RIS 510.

In a feasible implementation, the first positioning signal sent by the base station 300 is transmitted to the UE 100 via the second reflection path B.

The second reflection path B is provided through a second RIS 520. For example, the second reflection path B includes a transmission path passing through the base station 300, the second RIS 520, and the UE 100. The positioning signal may be sent out from the base station 300 along the second reflection path B, and reach the UE 100 after passing through the second RIS 520. It can be understood that the positioning signal may also be sent out from the UE 100 along the second reflection path B, and reach the base station 300 after passing through the second RIS 520.

The base station 300 receives a second positioning signal sent by the UE 100.

In a feasible implementation, the second positioning signal sent by the UE 100 is transmitted to the base station 300 via the line-of-sight transmission path C.

In a feasible implementation, the second positioning signal sent by the UE 100 is transmitted to the base station 300 via the first reflection path A.

In a feasible implementation, the second positioning signal sent by the UE 100 is transmitted to the base station 300 via the second reflection path B.

In a feasible implementation, the second positioning signal is a sounding reference signal for positioning (SRS-Pos).

The base station 300 obtains first time information according to a sending time point of the first positioning signal and a receiving time point of the second positioning signal. The first time information at least includes a first base station time difference, a second base station time difference, and a third base station time difference.

In a feasible implementation, the base station 300 obtains the first base station time difference according to a sending time point of the first positioning signal transmitted via the line-of-sight transmission path C and a receiving time point of the second positioning signal transmitted via the line-of-sight transmission path C.

In a feasible implementation, the base station 300 obtains the second base station time difference according to a sending time point of the first positioning signal transmitted via the first reflection path A and a receiving time point of the second positioning signal transmitted via the first reflection path A.

In a feasible implementation, the base station 300 obtains the third base station time difference according to a sending time point of the first positioning signal transmitted via the second reflection path B and a receiving time point of the second positioning signal transmitted via the second reflection path B.

The UE 100 receives the first positioning signal sent by the base station 300.

In a feasible implementation, the UE 100 receives the first positioning signal sent by the base station 300 and transmitted to the UE 100 via the line-of-sight transmission path C.

In a feasible implementation, the UE 100 receives the first positioning signal sent by the base station 300 and transmitted to the UE 100 via the first reflection path A.

In a feasible implementation, the UE 100 receives the first positioning signal sent by the base station 300 and transmitted to the UE 100 via the second reflection path B.

The UE 100 sends the second positioning signal to the base station 300.

In a feasible implementation, the second positioning signal sent by the UE 100 is transmitted to the base station 300 via the line-of-sight transmission path C.

In a feasible implementation, the second positioning signal sent by the UE 100 is transmitted to the base station 300 via the first reflection path A.

In a feasible implementation, the second positioning signal sent by the UE 100 is transmitted to the base station 300 via the second reflection path B.

The UE 100 obtains second time information according to a receiving time point of the first positioning signal and a sending time point of the second positioning signal. The second time information at least includes a first terminal device time difference, a second terminal device time difference, and a third terminal device time difference.

In a feasible implementation, the UE 100 obtains the first terminal device time difference according to a receiving time point of the first positioning signal transmitted via the line-of-sight transmission path C and a sending time point of the second positioning signal transmitted via the line-of-sight transmission path C.

In a feasible implementation, the UE 100 obtains the second terminal device time difference according to a receiving time point of the first positioning signal transmitted via the first reflection path A and a sending time point of the second positioning signal transmitted via the first reflection path A.

In a feasible implementation, the UE 100 obtains the third terminal device time difference according to a receiving time point of the first positioning signal transmitted via the second reflection path B and a sending time point of the second positioning signal transmitted via the second reflection path B.

As shown in FIG. 6, no line-of-sight path exists between the base station 300 and the UE 100, and at least three RISs are required to position the UE.

The base station 300 is configured for acquiring first time information, where the first time information is information representing a time difference between a time point at which the base station 300 sends a signal and a time point at which the base station 300 receives another signal. The base station 300 at least receives a signal respectively transmitted through three transmission paths, namely, a fourth reflection path D, a fifth reflection path E, and a sixth reflection path F.

The UE 100 is configured for acquiring second time information, where the second time information is information representing a time difference between a time point at which the UE 100 sends the another signal and a time point at which the UE 100 receives the signal. The UE 100 at least receives a signal respectively transmitted through three transmission paths, namely, the fourth reflection path D, the fifth reflection path E, and the sixth reflection path F.

The RIS 500 is configured for providing a signal transmission path between the base station 300 and the UE 100.

In a feasible implementation, the signal transmission path is a reflection path passing through the RIS 500.

The positioning server 400 is configured for positioning the UE 100 according to the first time information and the second time information.

Figure 7:
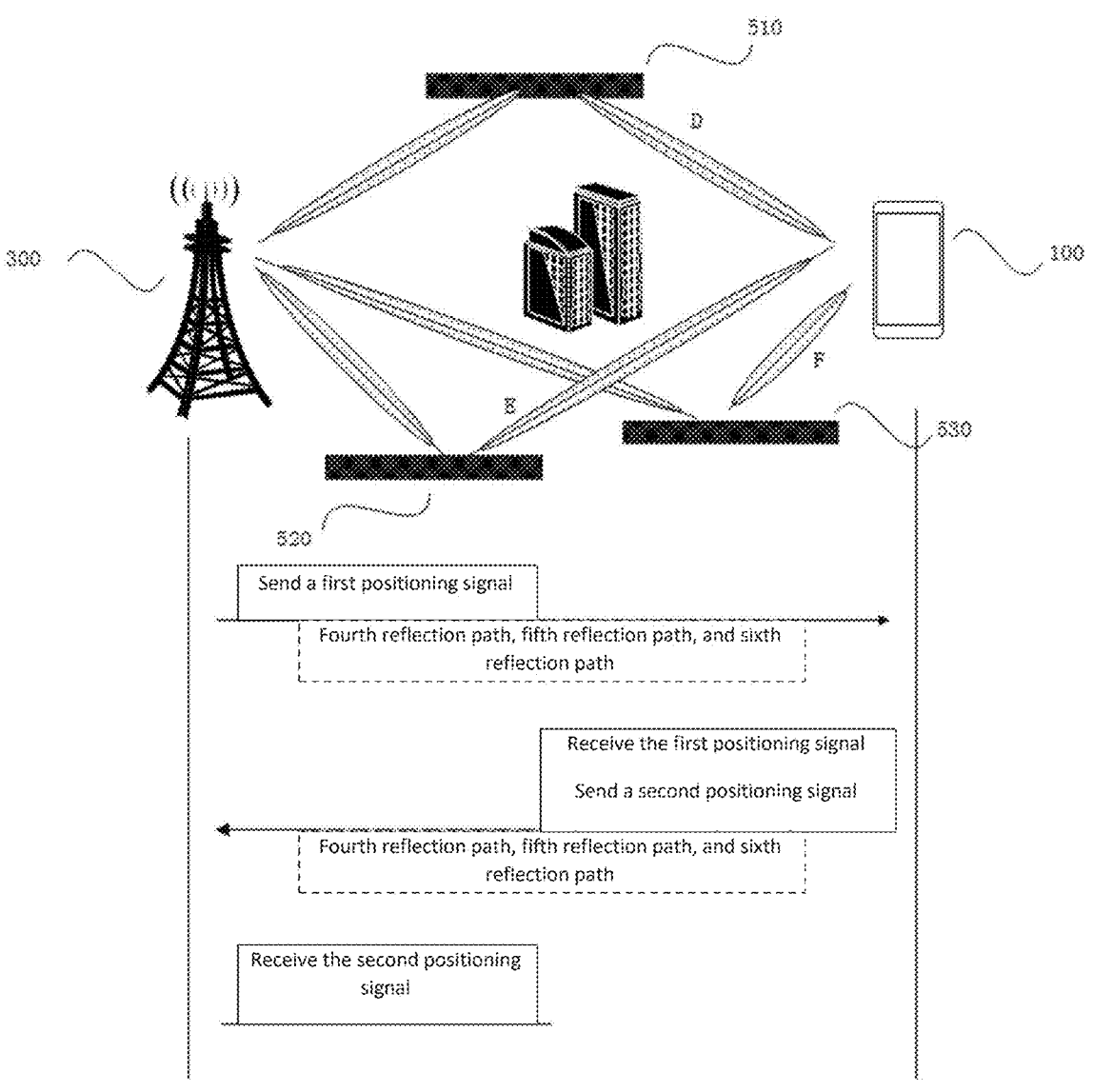
FIG. 7 is a flowchart of a positioning method according to an embodiment of the present disclosure.

FIG. 7 is a schematic diagram of a positioning method according to an embodiment of the present disclosure. The positioning method in this embodiment may be applied to the system architecture shown in FIG. 6.

The base station 300 sends a first positioning signal to the UE 100.

In a feasible implementation, the first positioning signal sent by the base station 300 is transmitted to the UE 100 via the sixth reflection path F.

The sixth reflection path F is provided through a first RIS 510. For example, the sixth reflection path F includes a transmission path passing through the base station 300, a third RIS 530, and the UE 100. The positioning signal may be sent out from the base station 300 along the sixth reflection path F, and reach the UE 100 after passing through the third RIS 530. It can be understood that the positioning signal may also be sent out from the UE 100 along the sixth reflection path F, and reach the base station 300 after passing through the third RIS 530.

In a feasible implementation, the first positioning signal sent by the base station 300 is transmitted to the UE 100 via the fourth reflection path D.

The fourth reflection path D is provided through a first RIS 510. For example, the fourth reflection path D includes a transmission path passing through the base station 300, the first RIS 510, and the UE 100. The positioning signal may be sent out from the base station 300 along the fourth reflection path D, and reach the UE 100 after passing through the first RIS 510. It can be understood that the positioning signal may also be sent out from the UE 100 along the fourth reflection path D, and reach the base station 300 after passing through the first RIS 510.

In a feasible implementation, the first positioning signal sent by the base station 300 is transmitted to the UE 100 via the fifth reflection path E.

The fifth reflection path E is provided through a second RIS 520. For example, the fifth reflection path E includes a transmission path passing through the base station 300, the second RIS 520, and the UE 100. The positioning signal may be sent out from the base station 300 along the fifth reflection path E, and reach the UE 100 after passing through the second RIS 520. It can be understood that the positioning signal may also be sent out from the UE 100 along the fifth reflection path E, and reach the base station 300 after passing through the second RIS 520.

The base station 300 receives a second positioning signal sent by the UE 100.

In a feasible implementation, the second positioning signal sent by the UE 100 is transmitted to the base station 300 via the sixth reflection path F.

In a feasible implementation, the second positioning signal sent by the UE 100 is transmitted to the base station 300 via the fourth reflection path D.

In a feasible implementation, the second positioning signal sent by the UE 100 is transmitted to the base station 300 via the fifth reflection path E.

The base station 300 obtains first time information according to a sending time point of the first positioning signal and a receiving time point of the second positioning signal. The first time information at least includes a first base station time difference, a second base station time difference, and a third base station time difference.

In a feasible implementation, the base station 300 obtains the first base station time difference according to a sending time point of the first positioning signal transmitted via the sixth reflection path F and a receiving time point of the second positioning signal transmitted via the sixth reflection path F.

In a feasible implementation, the base station 300 obtains the second base station time difference according to a sending time point of the first positioning signal transmitted via the fourth reflection path D and a receiving time point of the second positioning signal transmitted via the fourth reflection path D.

In a feasible implementation, the base station 300 obtains the third base station time difference according to a sending time point of the first positioning signal transmitted via the fifth reflection path E and a receiving time point of the second positioning signal transmitted via the fifth reflection path E.

The UE 100 receives the first positioning signal sent by the base station 300.

In a feasible implementation, the UE 100 receives the first positioning signal sent by the base station 300 and transmitted to the UE 100 via the sixth reflection path F.

In a feasible implementation, the UE 100 receives the first positioning signal sent by the base station 300 and transmitted to the UE 100 via the fourth reflection path D.

In a feasible implementation, the UE 100 receives the first positioning signal sent by the base station 300 and transmitted to the UE 100 via the fifth reflection path E.

The UE 100 sends the second positioning signal to the base station 300.

In a feasible implementation, the second positioning signal sent by the UE 100 is transmitted to the base station 300 via the sixth reflection path F.

In a feasible implementation, the second positioning signal sent by the UE 100 is transmitted to the base station 300 via the fourth reflection path D.

In a feasible implementation, the second positioning signal sent by the UE 100 is transmitted to the base station 300 via the fifth reflection path E.

The UE 100 obtains second time information according to a receiving time point of the first positioning signal and a sending time point of the second positioning signal. The second time information at least includes a first terminal device time difference, a second terminal device time difference, and a third terminal device time difference.

In a feasible implementation, the UE 100 obtains the first terminal device time difference according to a receiving time point of the first positioning signal transmitted via the sixth reflection path F and a sending time point of the second positioning signal transmitted via the sixth reflection path F.

In a feasible implementation, the UE 100 obtains the second terminal device time difference according to a receiving time point of the first positioning signal transmitted via the fourth reflection path D and a sending time point of the second positioning signal transmitted via the fourth reflection path D.

In a feasible implementation, the UE 100 obtains the third terminal device time difference according to a receiving time point of the first positioning signal transmitted via the fifth reflection path E and a sending time point of the second positioning signal transmitted via the fifth reflection path E.

FIG. 8 is a schematic flowchart of a positioning method according to an embodiment of the present disclosure. As shown in FIG. 8, the positioning method is applied to a positioning system including a UE 100, a base station 300, an LMF apparatus, and RISs 500. The LMF apparatus may be arranged in a positioning server 400 or may be integrated in the UE 100 or the base station 300. In this embodiment, the LMF apparatus is, for example, arranged in the positioning server 400. The positioning method may include, but not limited to, the following steps S810, S820, S830, S840, and S850.

At S810, the base station 300 sends a first positioning signal and obtains a sending time point of the base station, i.e., obtains a time point at which the base station 300 sends the first positioning signal.

At S820, the UE 100 receives the first positioning signal and obtains a receiving time point of the UE 100, i.e., obtains a time point at which the UE 100 receives the first positioning signal sent by the base station 300.

At S830, the UE 100 sends a second positioning signal to the base station 300 and obtains a sending time point of the UE 100, i.e., obtains a time point at which the UE 100 sends the second positioning signal.

At S840, the base station 300 receives the second positioning signal and obtains a receiving time point of the base station, i.e., obtains a time point at which the base station 300 receives the second positioning signal sent by the UE 100.

At S850, the positioning server 400 obtains location information of the UE 100 according to the sending time point of the base station, the receiving time point of the UE 100, the sending time point of the UE 100, and the receiving time point of the base station.

In a feasible implementation, the first positioning signal and the second positioning signal may be an SRS signal or an SRS-Pos signal.

The positioning method of the embodiment of the present disclosure requires only one base station and at least two RISs to realize high-precision positioning of the UE. As shown in FIG. 4, when a line-of-sight path exists between the base station and the UE, at least two RISs are required to position the UE. As shown in FIG. 6, when a non-line-of-sight environment exists between the base station and the UE, i.e., a building or other facilities blocking straight-line transmission of signals exist(s) between the base station and the UE, at least three RISs are required to position the UE. For ease of understanding of the technical schemes of the present disclosure, the schemes of the present disclosure will further be set forth through the following embodiments.

The RISs are connected to the base station in a wired or wireless manner, to communicate with the base station.

Each RIS reports its own array configuration information, geographic information, and other parameter information.

After receiving the array configuration information and the geographic information of the RIS, the base station maintains an RIS information table of a serving cell.

The base station calculates a codebook of an optimal beam of the base station and each RIS according to the parameter information of the RIS and the parameter information of the base station.

The base station reports the parameter information of the base station and the parameter information of the RIS to an LMF apparatus or a location management unit.

The LMF apparatus or the location management unit allocates at least one Positioning Reference Signal (PRS) configuration resource to the base station.

The UE is turned on and accesses the current cell or the UE moves to the current cell and is handed over to the current cell.

The base station performs beam training for the UE to obtain a base station-UE optimal paired beam and a base station-RIS-UE optimal paired beam. In a feasible implementation, the UE is an R16 UE, the base station informs the UE of PRS and SRS-Pos configurations, and the LMF apparatus provides the PRS and SRS-Pos configurations of the base station.

The base station determines whether a line-of-sight transmission path exists between the base station and the UE, and whether the number of RISs is greater than or equal to 2.

Example A

When a line-of-sight transmission path exists between the base station and the UE and the number of RISs is greater than or equal to 2, the following method is executed.

The base station sends one or more PRSs in a time division, frequency division, or space division manner. After being reflected by the line-of-sight transmission path and the two or more RISs, the one or more PRSs are received by the UE. The UE calculates arrival times of the one or more PRSs transmitted via the line-of-sight transmission path and reflection paths of the two or more RISs.

The UE sends an SRS-Pos, which is received by the base station via the line-of-sight transmission path and the reflection paths of the two or more RISs. The base station calculates arrival times of the SRS-Pos transmitted via the line-of-sight transmission path and the reflection paths of the two or more RISs.

The UE calculates time differences between receiving time points and sending time points of the PRS transmitted via the line-of-sight transmission path and the reflection paths of the two or more RISs, and reports the time differences to the LMF apparatus. The base station calculates time differences between receiving time points and sending time points of the SRS-Pos transmitted via the line-of-sight transmission path and the reflection paths of the two or more RISs, and reports the time differences to the LMF apparatus.

The LMF apparatus calculates Round-Trip Times (RTTs) of different paths, and calculates coordinates of the UE based on three or more RTTs, to realize the positioning of the UE.

Example B

When no line-of-sight transmission path exists between the base station and the UE and the number of RISs is greater than or equal to 3, the following method is executed.

The base station sends one or more PRSs in a time division, frequency division, or space division manner. After being reflected by the three or more RISs, the one or more PRSs are received by the UE. The UE calculates arrival times of the one or more PRSs transmitted via reflection paths of the three or more RISs.

The UE sends an SRS-Pos, which is received by the base station via the three or more RISs. The base station calculates arrival times of the SRS-Pos transmitted via the reflection paths of the three or more RISs.

The UE calculates time differences between receiving time points and sending time points of the PRS transmitted via the reflection paths of the RISs, and reports the time differences to the LMF apparatus. The base station calculates time differences between receiving time points and sending time points of the SRS-Pos transmitted via the reflection paths of the RISs, and reports the time differences to the LMF apparatus.

The LMF apparatus calculates RTTs of different paths, and calculates coordinates of the UE based on three or more RTTs, to realize the positioning of the UE.

FIG. 9 is a schematic flowchart of a positioning method according to an embodiment of the present disclosure. As shown in FIG. 9, the positioning method may include, but not limited to, steps S910, S920, and S930.

At S910, parameter information of at least two RISs and parameter information of a base station are acquired.

In a feasible implementation, the parameter information of the RISs may include array configuration information of the RISs, and may further include geographic information of the RISs. The array configuration information may include at least one of: a number of horizontal array elements, a number of vertical array elements, a spacing between array elements, a number of quantized bits, etc. The geographic information may include GPS coordinates, longitude and latitude coordinates, altitude, orientation, downtilt angle, location information in a geocentric rectangular coordinate system, location information in a geodetic coordinate system, etc.

In a feasible implementation, the parameter information of the base station may include geographic information of the base station. The geographic information may include GPS coordinates, longitude and latitude coordinates, altitude, orientation, downtilt angle, location information in a geocentric rectangular coordinate system, location information in a geodetic coordinate system, etc.

At S920, first time information and second time information are acquired.

In a feasible implementation, the first time information is information representing a time difference between a time point at which the base station sends a first positioning signal and a time point at which the base station receives a second positioning signal.

In a feasible implementation, the first time information includes a first base station time difference, a second base station time difference, and a third base station time difference. The first base station time difference is obtained according to a sending time point of the first positioning signal transmitted via the line-of-sight transmission path and a receiving time point of the second positioning signal transmitted via the line-of-sight transmission path. The second base station time difference is obtained according to a sending time point of the first positioning signal transmitted via the first reflection path and a receiving time point of the second positioning signal transmitted via the first reflection path. The third base station time difference is obtained according to a sending time point of the first positioning signal transmitted via the second reflection path and a receiving time point of the second positioning signal transmitted via the second reflection path.

In another feasible implementation, the first time information includes a fourth base station time difference, a fifth base station time difference, and a sixth base station time difference. The fourth base station time difference is obtained according to a sending time point of the first positioning signal transmitted via the fourth reflection path and a receiving time point of the second positioning signal transmitted via the fourth reflection path. The fifth base station time difference is obtained according to a sending time point of the first positioning signal transmitted via the fifth reflection path and a receiving time point of the second positioning signal transmitted via the fifth reflection path. The sixth base station time difference is obtained according to a sending time point of the first positioning signal transmitted via the sixth reflection path and a receiving time point of the second positioning signal transmitted via the sixth reflection path.

In a feasible implementation, the first positioning signal is sent out by the base station and transmitted to the terminal device via a line-of-sight transmission path, a first reflection path, and a second reflection path, respectively, or transmitted to the terminal device via a fourth reflection path, a fifth reflection path, and a sixth reflection path, respectively. The first reflection path is provided through a first RIS, the second reflection path is provided through a second RIS, the fourth reflection path is provided through a fourth RIS, the fifth reflection path is provided through a fifth RIS, and the sixth reflection path is provided through a sixth RIS.

In a feasible implementation, the second time information is information representing a time difference between a time point at which a terminal device sends the second positioning signal and a time point at which the terminal device receives the first positioning signal.

In a feasible implementation, the second time information includes a first terminal device time difference, a second terminal device time difference, and a third terminal device time difference. The first terminal device time difference is obtained according to a receiving time point of the first positioning signal transmitted via the line-of-sight transmission path and a sending time point of the second positioning signal via the line-of-sight transmission path. The second terminal device time difference is obtained according to a receiving time point of the first positioning signal transmitted via the first reflection path and a sending time point of the second positioning signal transmitted via the first reflection path. The third terminal device time difference is obtained according to a receiving time point of the first positioning signal transmitted via the second reflection path and a sending time point of the second positioning signal transmitted via the second reflection path.

In another feasible implementation, the second time information includes a fourth terminal device time difference, a fifth terminal device time difference, and a sixth terminal device time difference. The fourth terminal device time difference is obtained according to a receiving time point of the first positioning signal transmitted via the fourth reflection path and a sending time point of the second positioning signal transmitted via the fourth reflection path. The fifth terminal device time difference is obtained according to a receiving time point of the first positioning signal transmitted via the fifth reflection path and a sending time point of the second positioning signal transmitted via the fifth reflection path. The sixth terminal device time difference is obtained according to a receiving time point of the first positioning signal transmitted via the sixth reflection path and a sending time point of the second positioning signal transmitted via the sixth reflection path.

In a feasible implementation, the second positioning signal is sent out by the terminal device and transmitted to the base station via the line-of-sight transmission path, the first reflection path, and the second reflection path, respectively, or transmitted to the base station via a fourth reflection path, a fifth reflection path, and a sixth reflection path, respectively. The first reflection path is provided through a first RIS, the second reflection path is provided through a second RIS, the fourth reflection path is provided through a fourth RIS, the fifth reflection path is provided through a fifth RIS, and the sixth reflection path is provided through a sixth RIS.

At S930, location information of the terminal device is obtained according to the parameter information of the RISs, the parameter information of the base station, the first time information, and the second time information.

FIG. 10 is a schematic flowchart of a positioning method according to an embodiment of the present disclosure. As shown in FIG. 10, the positioning method may include, but not limited to, steps S1010, S1020, S1030, S1040, and S1050.

At S1010, parameter information of at least two RISs and parameter information of a base station are acquired.

In a feasible implementation, the parameter information of the RISs may include array configuration information of the RISs, and may further include geographic information of the RISs. The array configuration information may include at least one of: a number of horizontal array elements, a number of vertical array elements, a spacing between array elements, a number of quantized bits, etc. The geographic information may include GPS coordinates, longitude and latitude coordinates, altitude, orientation, downtilt angle, location information in a geocentric rectangular coordinate system, location information in a geodetic coordinate system, etc.

In a feasible implementation, the parameter information of the base station may include geographic information of the base station. The geographic information may include GPS coordinates, longitude and latitude coordinates, altitude, orientation, downtilt angle, location information in a geocentric rectangular coordinate system, location information in a geodetic coordinate system, etc.

At S1020, a first positioning signal is sent to a terminal device and a sending time point of the base station is obtained.

In a feasible implementation, the first positioning signal is transmitted to the terminal device via a line-of-sight transmission path, a first reflection path, and a second reflection path, respectively, where the first reflection path is provided through a first RIS, and the second reflection path is provided through a second RIS; or the first positioning signal is transmitted to the terminal device via a fourth reflection path, a fifth reflection path, and a sixth reflection path, respectively, where the fourth reflection path is provided through a fourth RIS, the fifth reflection path is provided through a fifth RIS, and the sixth reflection path is provided through a sixth RIS.

At S1030, a second positioning signal sent by the terminal device is received and a receiving time point of the base station is obtained.

In a feasible implementation, the second positioning signal is transmitted to the base station via a line-of-sight transmission path, a first reflection path, and a second reflection path, respectively, where the first reflection path is provided through a first RIS, and the second reflection path is provided through a second RIS; or transmitted to the base station via a fourth reflection path, a fifth reflection path, and a sixth reflection path, respectively, where the fourth reflection path is provided through a fourth RIS, the fifth reflection path is provided through a fifth RIS, and the sixth reflection path is provided through a sixth RIS.

At S1040, second time information is acquired, where the second time information is information representing a time difference between a time point at which a terminal device sends the second positioning signal and a time point at which the terminal device receives the first positioning signal.

At S1050, location information of the terminal device is obtained according to the parameter information of the RISs, the parameter information of the base station, the sending time point of the base station, the receiving time point of the base station, and the second time information.

FIG. 11 is a schematic flowchart of a positioning method according to an embodiment of the present disclosure. As shown in FIG. 11, the positioning method may include, but not limited to, steps S1110, S1120, S1130, S1140, and S1150.

At S1110, parameter information of at least two RISs and parameter information of a base station are acquired.

In a feasible implementation, the parameter information of the RISs may include array configuration information of the RISs, and may further include geographic information of the RISs. The array configuration information may include at least one of: a number of horizontal array elements, a number of vertical array elements, a spacing between array elements, a number of quantized bits, etc. The geographic information may include GPS coordinates, longitude and latitude coordinates, altitude, orientation, downtilt angle, location information in a geocentric rectangular coordinate system, location information in a geodetic coordinate system, etc.

In a feasible implementation, the parameter information of the base station may include geographic information of the base station. The geographic information may include GPS coordinates, longitude and latitude coordinates, altitude, orientation, downtilt angle, location information in a geocentric rectangular coordinate system, location information in a geodetic coordinate system, etc.

At S11020, a first positioning signal sent by the base station is received and a receiving time point of a terminal device is obtained.

In a feasible implementation, the first positioning signal is transmitted to the terminal device via a line-of-sight transmission path, a first reflection path, and a second reflection path, respectively, where the first reflection path is provided through a first RIS, and the second reflection path is provided through a second RIS; or transmitted to the terminal device via a fourth reflection path, a fifth reflection path, and a sixth reflection path, respectively, where the fourth reflection path is provided through a fourth RIS, the fifth reflection path is provided through a fifth RIS, and the sixth reflection path is provided through a sixth RIS.

At S1130, a second positioning signal is sent to the base station and a sending time point of the terminal device is obtained.

In a feasible implementation, the second positioning signal is transmitted to the base station via a line-of-sight transmission path, a first reflection path, and a second reflection path, respectively, where the first reflection path is provided through a first RIS, and the second reflection path is provided through a second RIS; or the second positioning signal is transmitted to the base station via a fourth reflection path, a fifth reflection path, and a sixth reflection path, respectively, where the fourth reflection path is provided through a fourth RIS, the fifth reflection path is provided through a fifth RIS, and the sixth reflection path is provided through a sixth RIS.

At S1140, first time information is acquired, where the first time information is information representing a time difference between a time point at which the base station sends the first positioning signal and a time point at which the base station receives the second positioning signal.

At S1150, location information of the terminal device is obtained according to the parameter information of the RISs, the parameter information of the base station, the receiving time point of the terminal device, the sending time point of the terminal device, and the first time information.

The application of an embodiment of the present disclosure will be described in further detail using an example where the base station is a millimeter wave base station, two RISs are deployed in the cell to realize coverage enhancement, the RISs communicate with the base station based on a 3rd Generation Partnership Project (3GPP) protocol or a private wireless module, a terminal device based on R16 supports RTT measurement, and both the base station and the UE comply with R16 protocols.

The base station is turned on, and the RISs are turned on. The RISs are connected to the base station in a private wireless manner and communicate with the base station. A first RIS and a second RIS report array configuration parameter information and geometric parameter information. After the RIS is connected to the base station for the first time, an RIS information table of the serving cell is maintained. The RIS information table includes array configuration parameter information and geometric parameter information of the RIS. When the RIS is connected to the base station not for the first time, the RIS does not need to report the parameter information, and the base station reads the parameter information of the RIS. The base station calculates a codebook of a base station-RIS optimal beam based on the geometric parameter information of the RIS and geometric parameter information of the base station.

In a feasible implementation, the array configuration parameter information includes, but not limited to, a number of horizontal array elements, a number of vertical array elements, a spacing between array elements, a number of quantized bits, etc.

In a feasible implementation, the geometric parameter information includes, but not limited to, GPS coordinates, height, orientation, downtilt angle, etc.

The base station reports the parameter information of the base station and the parameter information of the RIS to a positioning server. The positioning server (LMF) allocates one or more PRS configuration resources to the base station.

The UE is turned on and accesses the current cell. The base station performs beam training for the UE to obtain a base station-UE optimal paired beam and a base station-RIS-UE optimal paired beam. The base station informs the UE of PRS and SRS-Pos configurations, and the positioning server provides the PRS and SRS-Pos configurations of the base station nearby.

The base station determines whether a line-of-sight transmission path (LOS path) exists between the base station and the UE, and whether the number of RISs is greater than or equal to 2. If the conditions are satisfied, the base station performs positioning according to the following operations.

The base station sends a PRS in a time division manner. The base station sends the PRS respectively using a beam pointing to the UE, a beam pointing to a first RIS, and a beam pointing to a second RIS, and records PRS sending times tBSTxLos, tBSTxRIS1, and tBSTxRIS2. The PRS is received by the UE. The UE calculates arrival times tUERxLos, tUERxRIS1, and tUERxRIS2 of the PRS transmitted via a line-of-sight transmission path, a reflection path of the first RIS, and a reflection path of the second RIS.

The UE sends an SRS-Pos in a time division manner and records SRS-Pos sending times tUETxLos, tUETxRIS1, and tUETxRIS2. The base station receives the SRS-Pos via three paths in a time division manner and calculates SRS-Pos receiving times tBSRxLos, tBSRxRIS1, and tBSRxRIS2.

The UE calculates UE Rx-Tx time differences corresponding to the three paths: $tUERxTx0=tUETxLos-tUERxLos$, $tUERxTx1=tUETxRIS1-tUERxRIS1$, and $tUERxTx2=tUETxRIS2-tUERxRIS2$, and reports same to the positioning server. The base station calculates Rx-Tx time differences corresponding to the three paths: $tBSRxTx0=tBSRxLos-tBSTxLos$, $tBSRxTx1=tBSRxRIS1-tBSTxRIS1$, and $tBSRxTx2=tBSRxRIS2-tBSTxRIS2$, and reports same to the positioning server.

The positioning server calculates RTTs corresponding to three or more paths: $rtt0=tBSRxTx0-tUERxTx0$, $rtt1=tBSRxTx1-tUERxTx1$, and $rtt2=tBSRxTx2-tUERxTx2$. The positioning server calculates location coordinates of the UE according to the three or more RTTs to realize the positioning of the UE.

The application of an embodiment of the present disclosure will be described in further detail using an example where the base station is a millimeter wave base station, three RISs are deployed in the cell to realize coverage enhancement, the RISs communicate with the base station based on a 3GPP protocol or a private wireless module, a terminal device based on R16 supports RTT measurement, a base station based on R16 only supports configuration of one PRS, and both the base station and the PRS comply with R16 protocols.

The base station is turned on, and the RISs are turned on. The RISs are connected to the base station in a private wireless manner, to communicate with the base station. The three RISs report array configuration information, which includes, but not limited to, a number of horizontal array elements, a number of vertical array elements, a spacing between array elements, a number of quantized bits, etc.; and also report geometric parameter information, which includes, but not limited to, GPS coordinates, height, orientation, downtilt angle, etc. After the RIS is connected to the base station for the first time, an RIS information table of the serving cell is maintained. The RIS information table includes array configuration information and geometric parameter information of the RIS. When the RIS is connected to the base station not for the first time, the RIS does not need to report the parameter information, and the base station reads the parameter information of the RIS. The base station calculates a codebook of a base station-RIS optimal beam based on the geometric parameter information of the RIS and geometric parameter information of the base station.

The base station reports the geometric parameter information of the base station and the geometric parameter information of the RIS to the LMF, and the LMF allocates one or more PRS configuration resources to the base station.

The UE is turned on and accesses the current cell. The base station performs beam training for the UE to obtain a base station-RIS-UE optimal paired beam. The base station informs the UE of PRS and SRS-Pos configurations, and the LMF provides the PRS and SRS-Pos configurations of the base station nearby.

The base station determines whether an LOS path exists between the base station and the UE and whether the number of RISs is greater than or equal to 2. In this case, no LOS path exists between the base station and the UE, so the conditions are not satisfied. The base station further determines whether the number of RISs is greater than or equal to 3. In this case, this condition is satisfied, and the base station performs a positioning process.

The base station sends a PRS in a time division manner. The base station sends the PRS using a beam pointing to a first RIS and records a PRS sending time tBSTxRIS1. The PRS is received by the UE. The UE calculates an arrival time tUERxRIS1 of the PRS transmitted via the reflection path of the first RIS.

The UE sends an SRS-Pos and records an SRS-Pos sending time tUETxRIS1. The base station receives the SRS-Pos reflected by the first RIS. The base station calculates an SRS-Pos receiving time tBSRxRIS1.

The UE calculates a UE Rx-Tx time difference corresponding to the first RIS:

$$t_{UERxTx1} = t_{UETxRIS1} - t_{UERxRIS1}.$$ The base station calculates a base station Rx-Tx time difference:

$$t_{BSRxTx1} = t_{BSRxRIS1} - t_{BSTxRIS1}.$$

The base station repeats the above two steps to obtain $t_{UERxTx2}$ and $t_{BSRxTx2}$ corresponding to a second RIS, and $t_{UERxTx3}$ and $t_{BSRxTx3}$ corresponding to a third RIS in the same manner as that of obtaining the time difference $t_{UERxTx1}$.

The UE reports $t_{UERxTx1}$, $t_{UERxTx2}$, and $t_{UERxTx3}$ to the LMF. The base station reports $t_{BSRxTx1}$, $t_{BSRxTx2}$, and $t_{BSRxTx3}$ to the LMF.

The LMF calculates RTTs corresponding to three or more paths: $rtt_1 = t_{BSRxTx1} - t_{UERxTx1}$, $rtt_2 = t_{BSRxTx2} - t_{UERxTx2}$, and $rtt_3 = t_{BSRxTx3} - t_{UERxTx3}$. The LMF calculates location coordinates of the UE according to the three or more RTTs to realize the positioning of the UE.

The application of an embodiment of the present disclosure will be described in further detail using an example where the base station is a millimeter wave base station, three RISs are deployed in the cell to realize coverage enhancement, the RISs communicate with the base station based on a 3GPP protocol or a private wireless module, the base station supports configuration of two PRSs, and the UE is an R16 UE and supports RTT measurement.

The base station is turned on, and the RISs are turned on. The RISs are connected to the base station in a private wireless manner, to communicate with the base station. The three RISs report array configuration information, which includes, but not limited to, a number of horizontal array elements, a number of vertical array elements, a spacing between array elements, a number of quantized bits, etc.; and also report geometric parameter information, which includes, but not limited to, GPS coordinates, height, orientation, downtilt angle, etc. After the RIS is connected to the base station for the first time, an RIS information table of the serving cell is maintained. The RIS information table includes array configuration information and geometric parameter information of the RIS. When the RIS is connected to the base station not for the first time, the RIS does not need to report the parameter information, and the base station reads the parameter information of the RIS. The base station calculates a codebook of a base station-RIS optimal beam based on the geometric parameter information of the RIS and geometric parameter information of the base station. The LMF allocates one or more PRS configuration resources to the base station.

The base station reports the geometric parameter information of the base station and the geometric parameter information of the RIS to the LMF, and the LMF allocates one or more PRS configuration resources to the base station.

The UE is turned on and accesses the current cell. The base station performs beam training for the UE to obtain a base station-RIS-UE optimal paired beam. The base station informs the UE of PRS and SRS-Pos configurations, and the LMF provides the PRS and SRS-Pos configurations of the base station nearby.

The base station determines whether an LOS path exists between the base station and the UE and whether the number of RISs is greater than or equal to 2. In this case, no LOS path exists between the base station and the UE, so the conditions are not satisfied. The base station further determines whether the number of RISs is greater than or equal to 3. In this case, this condition is satisfied, and the base station performs a positioning process.

The base station sends a PRS in a downlink space division mode. The base station sends the PRS using a beam 1 pointing to an RIS 1, a beam 2 pointing to an RIS 2, and a beam 3 pointing to an RIS 3, respectively. The base station records PRS sending times tBSTxRIS. The UE receives the PRSs reflected by the three RISs. The UE calculates an arrival time tUERxRIS1 of the PRS transmitted via a reflection path of the RIS 1, an arrival time tUERxRIS2 of the PRS transmitted via a reflection path of the RIS 2, and an arrival time tUERxRIS3 of the PRS transmitted via a reflection path of the RIS 3.

The UE sends an SRS-Pos and records an SRS-Pos sending time tUETxRIS. The base station receives the SRS-Pos in an uplink space division manner. The base station respectively uses the beams pointing to the RIS 1, the RIS 2, and the RIS 3 to receives the SRS-Pos reflected by the RIS 1, the RIS 2, and the RIS 3. The base station calculates SRS-Pos receiving times tBSRxRIS1, tBSRxRIS2, and tBSRxRIS3.

The UE calculates UE Rx-Tx time differences respectively corresponding to the RIS 1, the RIS 2, and the RIS 3: $t_{UERxTx1} = t_{UETxRIS} - t_{UERxRIS1}$, $t_{UERxTx2} = t_{UETxRIS} - t_{UERxRIS2}$, and $t_{UERxTx3} = t_{UETxRIS} - t_{UERxRIS3}$, and reports same to the LMF. The base station calculates base station Rx-Tx time differences respectively corresponding to the RIS 1, the RIS 2, and the RIS 3: $t_{BSRxTx1} = t_{BSRxRIS1} - t_{BSTxRIS}$, $t_{BSRxTx2} = t_{BSRxRIS2} - t_{BSTxRIS}$, and $t_{BSRxTx3} = t_{BSRxRIS3} - t_{BSTxRIS}$, and reports same to the LMF.

The LMF calculates RTTs corresponding to reflection paths of the three RISs: $t_{RIS1} = t_{BSRxTx1} - t_{UERxTx1}$, $t_{RIS2} = t_{BSRxTx2} - t_{UERxTx2}$, and $t_{RIS3} = t_{BSRxTx3} - t_{UERxTx3}$. The LMF calculates location coordinates of the UE according to the three or more RTTs to realize the positioning of the UE.

Figure 12:
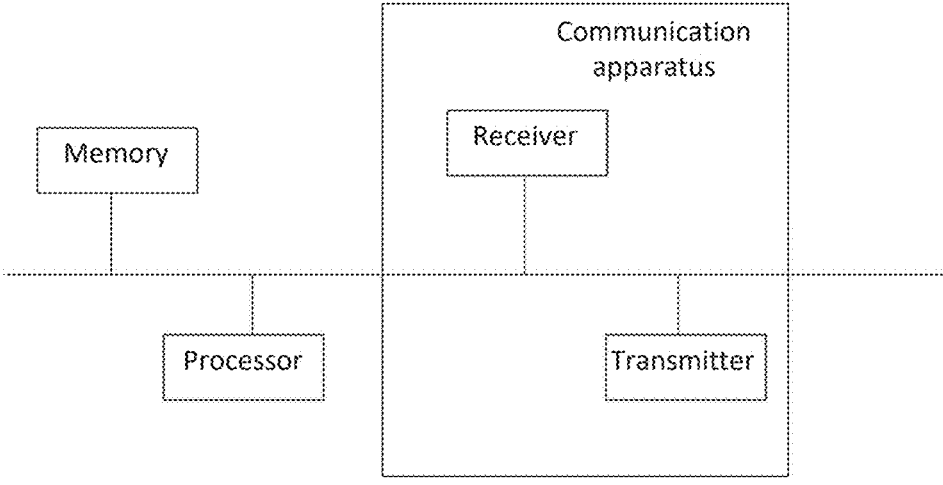
FIG. 12 is a schematic diagram of a positioning device according to an embodiment of the present disclosure.

FIG. 12 is a schematic structural diagram of a positioning device according to an embodiment of the present disclosure. As shown in FIG. 12, the device includes a memory, a processor, and a communication apparatus. The device may include one or more memories and one or more processors. FIG. 12 uses one memory and one processor as an example. The processor and the memory in the device may be connected by a bus or in other ways.

The memory, as a computer-readable storage medium, may be configured for storing a software program, a computer-executable program, and modules, for example, program instructions/modules corresponding to the positioning method provided in any embodiment of the present disclosure. The processor runs the software program, instructions, and modules stored in the memory, to implement the positioning method.

The memory may mainly include a program storage area and a data storage area. The program storage area may store an operating system, and an application required by at least one function. In addition, the memory may include a high-speed random access memory, and may also include a nonvolatile memory, e.g., at least one magnetic disk storage device, flash memory device, or other nonvolatile solid-state storage device. In some examples, the memory may further include memories located remotely from the processor, and the remote memories may be connected to the device via a network. Examples of the network include, but not limited to, the Internet, an intranet, a local area network, a mobile communication network, and combinations thereof.

The communication apparatus is configured for sending and receiving information under the control of the processor.

In an embodiment, the communication apparatus includes a receiver and a transmitter. The receiver is a module or combination of devices for receiving data in an electronic device. The transmitter is a module or combination of devices for sending data in the electronic device.

An embodiment of the present disclosure provides a computer-readable storage medium, storing a computer-executable instruction which, when executed by a processor, causes the processor to implement the positioning method provided in any embodiment of the present disclosure.

An embodiment of the present disclosure further provides a computer program product, including a computer program or a computer instruction stored in a computer-readable storage medium which, when read and executed by a processor of a computer device, causes the computer device to implement the positioning method provided in any embodiment of the present disclosure.

Those having ordinary skills in the art can understand that all or some of the steps in the methods disclosed above and the functional modules/units in the system and the apparatus can be implemented as software, firmware, hardware, and appropriate combinations thereof.

In a hardware implementation, the division of the functional modules/units mentioned in the above description does not necessarily correspond to the division of physical components. For example, one physical component may have multiple functions, or one function or step may be jointly executed by several physical components. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

In this description, terms like "component," "module," "system," and similar are intended to refer to computer-related entities, encompassing hardware, firmware, a combination of hardware and software, software, or software in execution. For instance, a component may be, without limitation, a process running on a processor, a processor, an object, an executable file, a thread of execution, a program, or a computer. An application running on a computing device and the computing device may both be illustrated as components. One or more components may reside in a process or thread of execution. A component may be located on one computer or distributed on two or more computers. In addition, the components may be executed from various computer-readable media having various data structures stored therein. The components may communicate via local and/or remote processes such as in accordance with a signal having one or more data packets (e.g., data from one component interacting with another component in a local system, distributed system, and/or across a network such as the Internet with other systems via the signal).

Although some embodiments of the present disclosure are described above with reference to the accompanying drawings, these embodiments are not intended to limit the scope of protection of the present disclosure. Any modifications, equivalent replacements and improvements made by those having ordinary skills in the art without departing from the scope and essence of the present disclosure shall fall within the scope of protection of the present disclosure.

What is claimed is:

1. A positioning method, comprising:
acquiring parameter information of at least two Reconfigurable Intelligent Surfaces (RISs) and parameter information of a base station;
acquiring first time information and second time information, wherein the first time information is information representing a time difference between a time point at which the base station sends a first positioning signal and a time point at which the base station receives a second positioning signal, and the second time information is information representing a time difference between a time point at which a terminal device sends the second positioning signal and a time point at which the terminal device receives the first positioning signal; and
obtaining location information of the terminal device according to the parameter information of the RISs, the parameter information of the base station, the first time information, and the second time information.

2. The method of claim 1, wherein,
the first positioning signal is sent out by the base station and transmitted to the terminal device via a line-of-sight transmission path, a first reflection path, and a second reflection path, respectively;
the second positioning signal is sent out by the terminal device and transmitted to the base station via the line-of-sight transmission path, the first reflection path, and the second reflection path, respectively; and
the first reflection path is provided through a first RIS, and the second reflection path is provided through a second RIS.

3. The method of claim 2, wherein, the first time information comprises a first base station time difference, a second base station time difference, and a third base station time difference;

wherein the first base station time difference is obtained according to a sending time point of the first positioning signal transmitted via the line-of-sight transmission path and a receiving time point of the second positioning signal transmitted via the line-of-sight transmission path; the second base station time difference is obtained according to a sending time point of the first positioning signal transmitted via the first reflection path and a receiving time point of the second positioning signal transmitted via the first reflection path; the third base station time difference is obtained according to a sending time point of the first positioning signal transmitted via the second reflection path and a receiving time point of the second positioning signal transmitted via the second reflection path;

the second time information comprises a first terminal device time difference, a second terminal device time difference, and a third terminal device time difference;

wherein the first terminal device time difference is obtained according to a receiving time point of the first positioning signal transmitted via the line-of-sight transmission path and a sending time point of the second positioning signal transmitted via the line-of-sight transmission path; the second terminal device time difference is obtained according to a receiving time point of the first positioning signal transmitted via the first reflection path and a sending time point of the second positioning signal transmitted via the first reflection path; and the third terminal device time difference is obtained according to a receiving time point of the first positioning signal transmitted via the second reflection path and a sending time point of the second positioning signal transmitted via the second reflection path.

4. The method of claim 1, wherein:

the first positioning signal is sent out by the base station and transmitted to the terminal device via a fourth reflection path, a fifth reflection path, and a sixth reflection path, respectively;

the second positioning signal is sent out by the terminal device and transmitted to the base station via a fourth reflection path, a fifth reflection path, and a sixth reflection path, respectively; and the fourth reflection path is provided through a fourth RIS, the fifth reflection path is provided through a fifth RIS, and the sixth reflection path is provided through a sixth RIS.

5. The method of claim 4, wherein:

the first time information comprises a fourth base station time difference, a fifth base station time difference, and a sixth base station time difference;

wherein the fourth base station time difference is obtained according to a sending time point of the first positioning signal transmitted via the fourth reflection path and a receiving time point of the second positioning signal transmitted via the fourth reflection path; the fifth base station time difference is obtained according to a sending time point of the first positioning signal transmitted via the fifth reflection path and a receiving time point of the second positioning signal transmitted via the fifth reflection path; the sixth base station time difference is obtained according to a sending time point of the first positioning signal transmitted via the sixth reflection path and a receiving time point of the second positioning signal transmitted via the sixth reflection path;

the second time information comprises a fourth terminal device time difference, a fifth terminal device time difference, and a sixth terminal device time difference;

the fourth terminal device time difference is obtained according to a receiving time point of the first positioning signal transmitted via the fourth reflection path and a sending time point of the second positioning signal transmitted via the fourth reflection path; the fifth terminal device time difference is obtained according to a receiving time point of the first positioning signal transmitted via the fifth reflection path and a sending time point of the second positioning signal transmitted via the fifth reflection path; and the sixth terminal device time difference is obtained according to a receiving time point of the first positioning signal transmitted via the sixth reflection path and a sending time point of the second positioning signal transmitted via the sixth reflection path.

6. A positioning method, comprising:

acquiring parameter information of at least two Reconfigurable Intelligent Surfaces (RISs) and parameter information of a base station;

sending a first positioning signal to a terminal device and obtaining a sending time point of the base station;

receiving a second positioning signal sent by the terminal device and obtaining a receiving time point of the base station;

acquiring second time information, wherein the second time information is information representing a time difference between a time point at which the terminal device sends the second positioning signal and a time point at which the terminal device receives the first positioning signal; and obtaining location information of the terminal device according to the parameter information of the RISs, the parameter information of the base station, the sending time point of the base station, the receiving time point of the base station, and the second time information.

7. The method of claim 6, wherein sending a first positioning signal to a terminal device and obtaining a sending time point of the base station comprises:

transmitting the first positioning signal to the terminal device via a line-of-sight transmission path, a first reflection path, and a second reflection path, respectively, wherein the first reflection path is provided through a first RIS, and the second reflection path is provided through a second RIS; or transmitting the first positioning signal to the terminal device via a fourth reflection path, a fifth reflection path, and a sixth reflection path, respectively, wherein the fourth reflection path is provided through a fourth RIS, the fifth reflection path is provided through a fifth RIS, and the sixth reflection path is provided through a sixth RIS.

8. A positioning method, comprising:

acquiring parameter information of at least two Reconfigurable Intelligent Surfaces (RISs) and parameter information of a base station;

receiving a first positioning signal sent by the base station and obtaining a receiving time point of a terminal device;

sending a second positioning signal to the base station and obtaining a sending time point of the terminal device;

acquiring first time information, wherein the first time information is information representing a time difference between a time point at which the base station sends the first positioning signal and a time point at which the base station receives the second positioning signal; and obtaining location information of the terminal device according to the parameter information of the RISs, the parameter information of the base station, the receiving time point of the terminal device, the sending time point of the terminal device, and the first time information.

9. The method of claim 8, wherein sending a second positioning signal to the base station and obtaining a sending time point of the terminal device comprises:

transmitting the second positioning signal to the base station via a line-of-sight transmission path, a first reflection path, and a second reflection path, respectively, wherein the first reflection path is provided through a first RIS, and the second reflection path is provided through a second RIS; or transmitting the second positioning signal to the base station via a fourth reflection path, a fifth reflection path, and a sixth reflection path, respectively, wherein the fourth reflection path is provided through a fourth RIS, the fifth reflection path is provided through a fifth RIS, and the sixth reflection path is provided through a sixth RIS.

10. A positioning system, comprising:

a base station, configured for acquiring first time information, wherein the first time information is information representing a time difference between a time point at which the base station sends a signal and a time point at which the base station receives another signal;

a terminal device, configured for acquiring second time information, wherein the second time information is information representing a time difference between a time point at which the terminal device sends the another signal and a time point at which the terminal device receives the signal;

a Reconfigurable Intelligent Surfaces (RIS), configured for providing a signal transmission path between the base station and the terminal device, wherein the signal transmission path is a reflection path; and a positioning server, configured for positioning the terminal device according to the first time information and the second time information.

11. The system of claim 10, wherein the base station is further configured for:

sending a first positioning signal to the terminal device;
receiving a second positioning signal sent by the terminal device; and
obtaining the first time information according to a sending time point of the first positioning signal and a receiving time point of the second positioning signal.

12. The system of claim 11, wherein the base station is further configured for:

sending the first positioning signal to the terminal device via a line-of-sight transmission path; and
sending the first positioning signal to the terminal device via a first reflection path and a second reflection path, respectively, wherein the first reflection path is provided through a first RIS, and the second reflection path is provided through a second RIS.

13. The system of claim 12, wherein the base station is further configured for:

receiving, via the line-of-sight transmission path, the second positioning signal sent by the terminal device; and receiving, respectively via the first reflection path and the second reflection path, the second positioning signal sent by the terminal device.

14. The system of claim 13, wherein the base station is further configured for:

obtaining a first base station time difference according to a sending time point of the first positioning signal transmitted via the line-of-sight transmission path and a receiving time point of the second positioning signal transmitted via the line-of-sight transmission path;

obtaining a second base station time difference according to a sending time point of the first positioning signal transmitted via the first reflection path and a receiving time point of the second positioning signal transmitted via the first reflection path;

obtaining a third base station time difference according to a sending time point of the first positioning signal transmitted via the second reflection path and a receiving time point of the second positioning signal transmitted via the second reflection path; and determining the first base station time difference, the second base station time difference, and the third base station time difference as the first time information.

15. The system of claim 10, wherein the terminal device is further configured for:

receiving a first positioning signal sent by the base station;
sending a second positioning signal to the base station; and
obtaining the second time information according to a receiving time point of the first positioning signal and a sending time point of the second positioning signal.

16. The system of claim 15, wherein the terminal device is further configured for:

receiving, via a line-of-sight transmission path, the first positioning signal sent by the base station; and receiving, respectively via a first reflection path and a second reflection path, the first positioning signal sent by the base station, wherein the first reflection path is provided through a first RIS, and the second reflection path is provided through a second RIS.

17. The system of claim 16, wherein the terminal device is further configured for:

sending the second positioning signal to the base station via the line-of-sight transmission path; and sending the second positioning signal to the base station via the first reflection path and the second reflection path, respectively.

18. A positioning device, comprising:

a memory, a processor, and a computer program stored in the memory and executable by the processor, wherein the computer program, when executed by the processor, causes the processor to perform the positioning method of claim 1.

19. A non-transitory computer-readable storage medium, storing a computer-executable instruction which, when executed by a processor, causes the processor to perform the positioning method of claim 1.

20. A computer program product, comprising a computer program or a computer instruction stored in a non-transitory computer-readable storage medium which, when read and executed by a processor of a computer device, causes the computer device to perform the positioning method of claim 1.

* * * * *